United States Patent [19]
Smith

[11] Patent Number: 5,215,421
[45] Date of Patent: Jun. 1, 1993

[54] WAREHOUSE SYSTEM

[76] Inventor: Charles E. Smith, 9011 Audrey Dr., Baton Rouge, La. 70809

[21] Appl. No.: 790,756

[22] Filed: Nov. 12, 1991

[51] Int. Cl.⁵ .................................................. B65G 1/00
[52] U.S. Cl. ....................................... 414/276; 193/2 R; 211/59.3; 221/200; 414/786
[58] Field of Search ............... 414/276, 786; 193/2 R; 221/200; 211/59.3

[56] References Cited

U.S. PATENT DOCUMENTS

| | | | |
|---|---|---|---|
| 296,600 | 4/1884 | Norwood | 414/276 |
| 699,690 | 5/1902 | Leetham | 414/276 |
| 1,702,987 | 2/1929 | Wilson | 211/59.3 X |
| 2,096,958 | 10/1937 | Clerc | 414/276 |
| 2,110,299 | 3/1938 | Hinkle | 211/59.3 |
| 2,284,488 | 5/1942 | Johnson | 193/2 R |
| 2,983,392 | 5/1961 | Ebbert | 414/276 |
| 3,027,023 | 3/1962 | McGrath | 414/276 |
| 3,247,929 | 4/1966 | Langley | 414/276 X |
| 3,434,604 | 3/1969 | Haldimann et al. | 414/281 |
| 3,561,619 | 2/1971 | Weir | 414/276 X |
| 3,581,921 | 6/1971 | Boissevain et al. | 414/786 |
| 3,612,305 | 10/1971 | Wesserman | 414/285 |
| 3,675,801 | 7/1972 | Larson et al. | 414/417 |
| 3,753,507 | 8/1973 | James et al. | 414/276 |
| 3,880,299 | 4/1975 | Zollinger et al. | 414/273 |
| 4,195,737 | 4/1980 | Rysti | 414/276 X |
| 4,239,436 | 12/1980 | Wildenaur | 414/276 |
| 4,314,648 | 2/1982 | Spamer | 193/2 R X |
| 4,527,937 | 7/1985 | Tomasello, Jr. | 414/276 X |
| 4,579,499 | 4/1986 | Mikes | 414/276 X |
| 4,621,745 | 11/1986 | Grace | 414/276 X |
| 4,715,487 | 12/1987 | Saika | 193/2 R |
| 4,762,457 | 8/1988 | Stefan | 414/276 |
| 4,790,707 | 12/1988 | Magretta et al. | 414/276 |
| 4,915,566 | 4/1990 | van Elten | 414/276 |
| 5,002,449 | 3/1991 | Kita et al. | 414/273 |
| 5,024,572 | 6/1991 | Tanaka et al. | 414/276 |
| 5,125,782 | 6/1992 | Goldschmidt et al. | 414/276 |

*Primary Examiner*—David A. Bucci
*Attorney, Agent, or Firm*—David L. Ray

[57] ABSTRACT

In accordance with the present invention there is provided a warehouse system in which containers are stored on a gravity chute system inclined at an angle with the horizontal sufficient to overcome the kinetic coefficient of friction between the chute and a container placed thereon and may overcome the static coefficient of friction between the chute and a container placed thereon. The warehouse system includes a receiving system, a storage system, a shipping system, and an inventory system.

17 Claims, 3 Drawing Sheets

WAREHOUSE SYSTEM

BACKGROUND OF THE INVENTION

1. Field of the Invention

The present invention is related to warehouses. In particular, the present invention is related to systems for efficiently storing and retrieving goods in warehouses.

2. Description of the Related Art

Warehouses and warehouse storage systems are known in the art. There are many different systems used in large warehouses to store products. Each of the systems employs the basic procedure of storing product on some sort of pallet storage system or gravity flow rail system.

The most well known warehousing system utilizes pallets loaded with cases of product stored in pallet racks. The pallets are moved by vehicles known in the art as forklifts from the area of the warehouse where they are received to the storage locations, and the pallets are placed on racks. When the containers are needed for shipment, a forklift and a driver are required to remove the pallet from storage and place it in a selection location. The shipper then selects containers to be shipped to stores.

A small system used in warehousing is the gravity flow rail system. This system requires forklifts, forklift drivers and laborers to break the pallet loads down and store containers on rollers. The gravity flow rail is limited in that it can handle only hard bottom cases. Products stored in bags or pails will not flow directly on the gravity flow rail system.

Exemplary of additional warehouses and warehouse systems of the prior art are those disclosed in the following U.S. Patents:

U.S. Pat. No. 3,027,023 discloses a warehousing apparatus which handles product in pallet load quantity throughout unloading, storage, and retrieval from storage. Product is stored on gravity roller conveyors whereas the new system of the present invention handles all product as single cases and stores them on gravity chutes. Pallet loads of product must be retrieved from storage by a depalletizer and delivered to the order-filling conveyors, whereas the warehouse system of the invention requires no such operation and single cases are available for order picking directly from the storage chutes. At best, the patented system has a storage capacity of only two layers high whereas the warehouse system of the invention will find the entire working cubic space of a warehouse.

U.S. Pat. No. 3,434,604 discloses a material handling system including a method to store palletized units of product by conveying pallets across the storage area on rolling pallets not gravity chutes.

U.S. Pat. No. 3,561,619 discloses a warehousing system and apparatus therefor that takes product and stores it in single case quantity, then presents the cases for order selection. The patented system stores incoming product from trucks and rail cars on pallets as the primary means of storage, whereas the warehouse system of the present invention uses single case storage as the primary means of storage.

The pallets in the patented system must be moved by a fork lift with an operator to a rack adjacent to the single case roller conveyors, whereas the warehouse system of the present invention requires no such move. A warehouseman utilizing the patented system must unstack the pallet onto roller conveyors that feed the order selection station, whereas the warehouse system of the present invention requires no such operation. Furthermore, the warehouse system of the present invention uses gravity chutes instead of roller conveyors.

The patented system is shown as a single row of storage that must be repeated in its entirety many times over to match the need of a warehouse. For each row, the patented system uses a mechanical elevated conveyor platform to bring the warehouseman in contact with cases to be shipped, and these cases are sent by conveyor to the loading station where another warehouseman stacks the cases for shipment. An elevator is required to move the cases to the shipping conveyor. The warehouse system of the present invention eliminates these steps by bringing all cases to ground level, thus allowing one warehouseman to be used on each row. The patented system requires four warehousemen (fork lift operator, pallet unstacker, order selector, and stacker) per row to perform the same function.

U.S. Pat. No. 3,581,921 discloses a method of processing articles on endless conveyor in a warehouse that is a palletized and totally mechanized storage system. The patented system conveys product across the warehouse on conveyors and has no gravity chutes.

U.S. Pat. No. 3,612,305 discloses a loading dock structure and small goods handling system for a trunk line terminal for over-the-road hauling carriers including a loading dock conveyor in the form of an endless belt or chain extending directly through an opening in the loading dock surface to provide a device for conveying small goods and packages to a lower level of a warehouse or terminal for sorting and distribution of the small goods according to delivery zones and immediate dispatch to respective zone carriers parked at the same terminal.

U.S. Pat. No. 3,675,801 discloses a method and apparatus for facilitating the stacking, storing, loading, unloading, selection, and separation of elongated bar and other similar materials, in which an elongated roller conveyor is sectionalized to provide a main material loading and unloading section in association with a supply feeder section at one end and an exit discharge section at its other end, a pallet pan being provided for the elongated material which can either be conveyed to the main section by a crane, fork-lift truck or the like, or delivered directly from the feed section of the conveyor.

U.S. Pat. No. 3,880,299 discloses a warehousing system including a device to store and retrieve a pallet load of products, whereas the warehouse system of the present invention stores and retrieves single containers of a product, not a pallet load of a given product.

U.S. Pat. No. 4,527,937 discloses an automatic storage and distribution system which automatically dispenses items from storage lanes and stores product in a single line along product lanes and uses pallet loads of product to replenish the storage system, whereas the warehouse system of the present invention stores the product directly from the receiving vehicle.

The patented system requires a conveyor at each product lane in order for the automatic system to work, whereas the warehouse system of the present invention does not and therefore costs less to install. This patented system uses standard gravity conveyors as the product storage lanes, whereas, the warehouse system of the present invention uses slide chutes made of steel or plastic materials.

The patented system must use mechanical release mechanisms on each product lane, whereas, the warehouse system of the invention requires no release mechanism. The patented system requires a retractable arm operated by an air cylinder to move the product elements in each lane backwards to break the static friction between the product carton and the gravity conveyor, whereas, the warehouse system of the present invention uses an inexpensive pull rope system or the angle of the chutes to break the static friction between the product carton an the chutes.

The patented system requires a control system to release the products in each lane, whereas the warehouse system of the present invention does not. The patented system requires a holding clamp on each product lane to hold back product in the lane, whereas, the warehouse system of the present invention requires no such holding clamp.

The patented system requires an expensive hydraulic jack system to change the pitch angle of each product lane which allows the mechanical releasing system to work effectively, whereas the new system requires no mechanical release system and no expensive jack system to change the pitch angle.

This patented system uses a rolling depalletizing vehicle, fork lifts, a pallet storage area and two men to replenish product into the product lanes, whereas, the new system use none of these above items.

The patented system uses a depalletizer with two operators, a forklift with an operator, and a conveyor system to each product row to replenish product in each product lane and can only send product to rows that open on the vertical plane. The warehouse system of the present invention is designed to eliminate the need for pallets, pallet storage areas, fork lifts in the replenishing step, operators to operate depalletizers, and the conveyors to each row of product lanes. In fact, the warehouse system of the invention eliminates the replenishing mode all together in that the product is conveyed directly from the receiving trucks or rail cars to the storage chutes without additional handling.

The patented system uses gravity conveyors to handle and store product in product lanes which cannot by used for soft bottom or irregular bottom containers such as sacks of potatoes and is restricted hard bottom cartons, whereas, the new system can handle any container such as sacks of potatoes, bagged items such as dog food, sugar, products in pails, frozen foods, produce food, etc.

The patented system with it mechanical releasing mechanism cannot operate in a freezer warehouse, whereas, the new system without a mechanical dispensing system can.

U.S. Pat. No. 4,579,499 discloses a storage device with radiated command signal for storing a number of different articles including containers which are placed in a receiving frame on resting surfaces and acted on in an ejection direction which is perpendicular to the lengthwise direction of the resting surfaces. The containers are held in the receiving frame by a holdback device which can be overcome by action of a release device, each container having, associated with it, a release device and a receiving and code recognition device with which a given code is associated.

U.S. Pat. No. 4,621,745 discloses a mechanized carton picker which uses a shelf latching system on each level to store product, whereas the warehouse system of the present invention uses less expensive gravity chutes made of steel of plastic materials.

The patented system requires a conveyor under each row of storage, whereas the warehouse system of the present invention system does not. The patented system requires more space for one carton of product than the warehouse system of the present invention.

U.S. Pat. No. 5,002,449 discloses an automatic storage/retrieval apparatus for articles in which inner pickers are provided for respective stages of racks of storage ares to be movable on rails. Operations of the inner pickers are independently controlled in the respective rack stages by optical communication through optical communication through optical communication units.

U.S. Pat. No. 5,024,572 discloses a goods handling method and apparatus thereof for carrying in or carrying out goods with respect to storage facilities having multirow and multistage storing spaces in which cases are stored single file within a rack system. The method of input and output into the rack system is entirely different from the warehouse system of the present invention and the rack system of the patented system uses roller conveyors to store product within the rack system.

SUMMARY OF THE INVENTION

In accordance with the present invention there is provided a warehouse system in which containers are stored on a gravity chute system inclined at an angle with the horizontal sufficient to overcome the kinetic coefficient of friction between the chute and a container placed thereon and may overcome the static coefficient of friction between the chute and a container placed thereon. The warehouse system includes a receiving system, a storage system, a shipping system, and an inventory system.

One advantage of the present invention is to provide a more efficient warehousing material handling system.

Another advantage of the invention is to provide an improved warehousing system that can be installed in existing warehouses as well as newly constructed warehouses.

An additional advantage of the invention is the storage of containers in a warehouse with less operating cost than present warehousing material handling systems.

Furthermore, the present invention eliminates the unloading of trucks and railroad cars with forklifts.

Additionally, the present invention eliminates the need for large receiving docks, moving pallets of containers from receiving to storage, and moving pallets of containers from storage to order selection.

Another very important advantage of the invention is that containers can be stored in about one third the volume required by conventional pallet rack storage systems.

A principal advantage of the invention is that most forms of containers may be stored in the warehouse system of the invention.

BRIEF DESCRIPTION OF THE DRAWINGS

The invention will be more easily understood by reference to the drawings in which.

DESCRIPTION OF THE PREFERRED EMBODIMENTS

Figure 1:
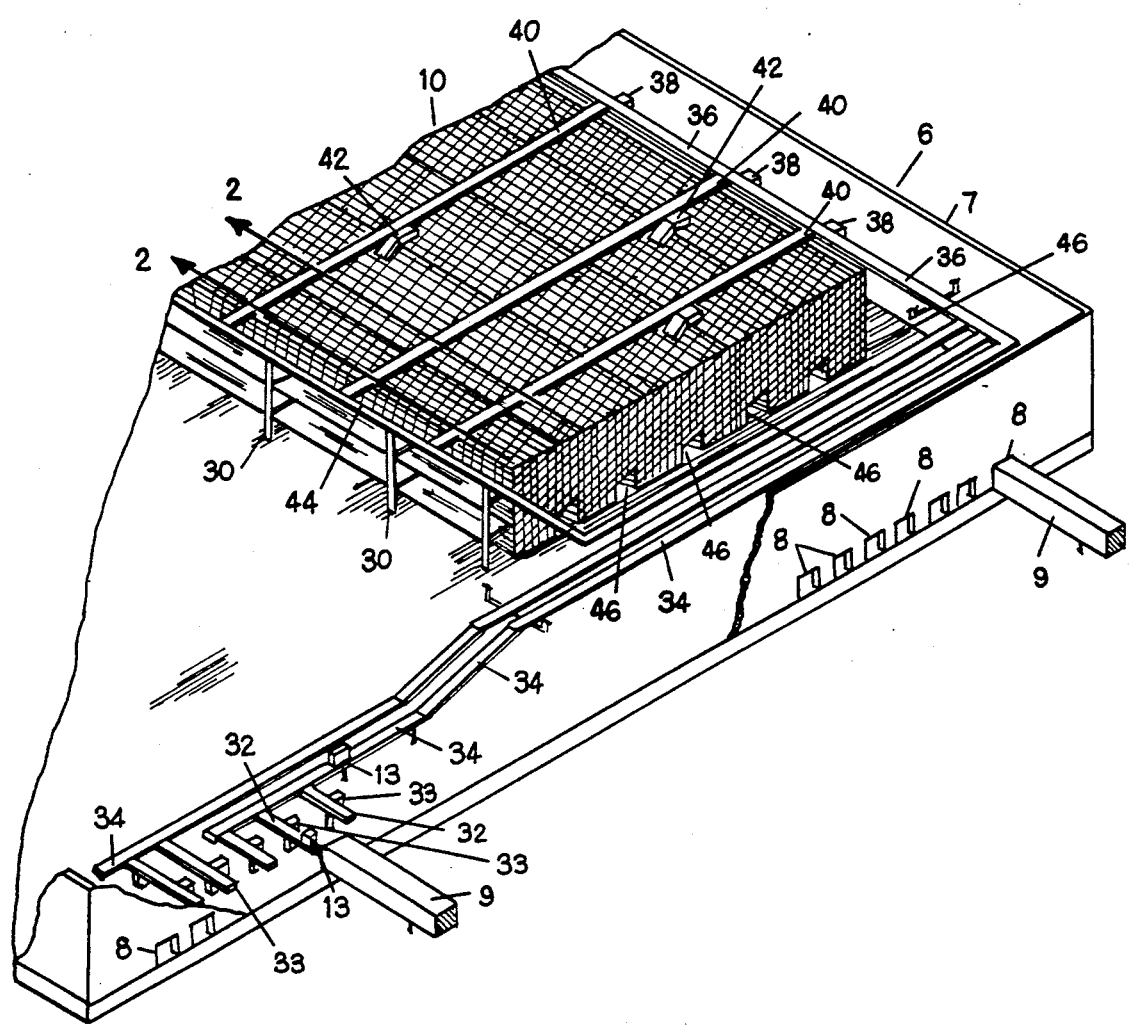
FIG. 1 is a partly cut-away, perspective view of the receiving area, the distribution conveyors, and the gravity chute racks of the warehouse system of the invention.

Referring now to the drawings, in FIG. 1 is a partly cut-away, perspective view of the warehouse system of the invention. The warehouse is generally indicated by the numeral 6. Warehouse 6 has walls 7 with entrance ports 8. Trailers 9 containing goods to be stored in the warehouse or shipped from the warehouse 6 are parked adjacent to entrance ports 8 for loading or unloading. Railroad cars could also be used to deliver containers of goods to the warehouse 6.

Figure 2:
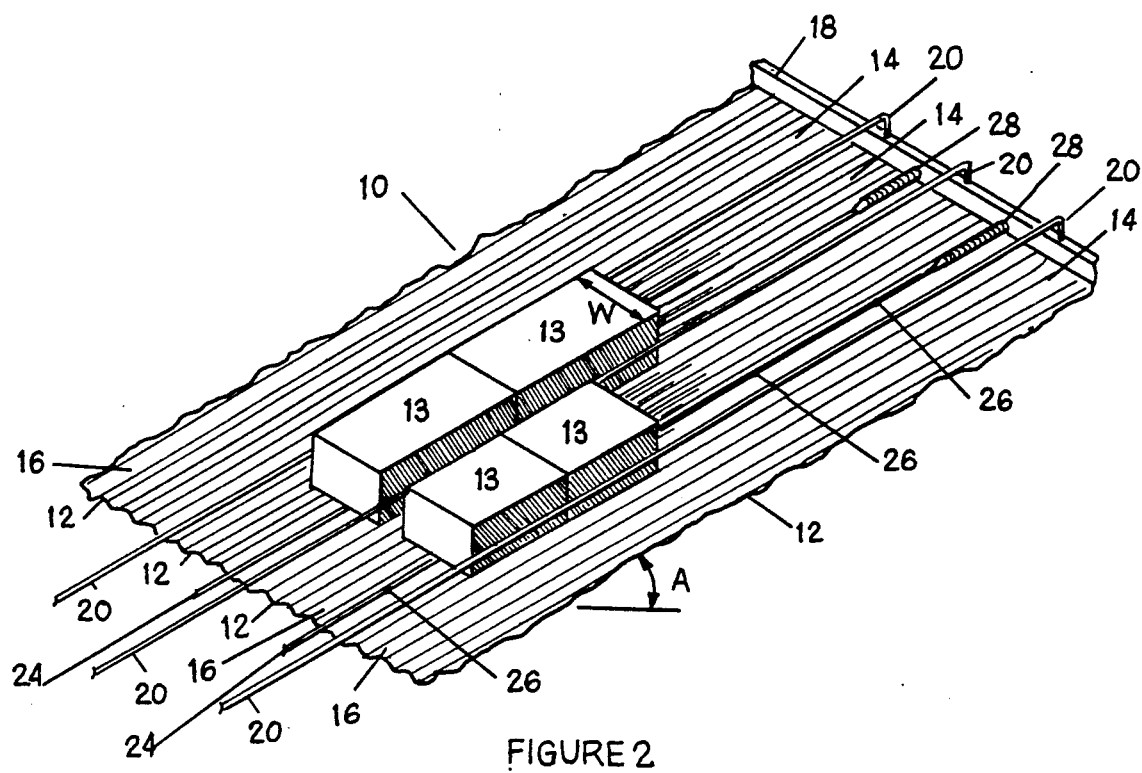
FIG. 2 is a perspective view of the gravity slide chute of the inventions.

In FIGS. 1 and 2 is shown the gravity slide chute assembly of the invention generally indicated by the numeral 10. The gravity slide chute assembly includes a plurality of generally rectangular chutes 12 defined by guide rails 20 for storing and transporting containers. Chutes 12 can be constructed from rigid sheets of iron, steel, plastic, or a combination of steel and plastic. Rectangular corrugated steel sheets are preferred. Chutes 12 are preferably constructed from corrugated, rectangular sheet material as shown in FIG. 2 because the corrugated sheet is stronger and less likely to bend or sag for a given thickness than a flat sheet.

Chutes 12 support containers 13 which may rest stationarily thereon or may slide thereover. Containers 13 may vary in size and have a width indicated by the letter "w" in FIG. 2. Containers 13 are commonly cardboard boxes which contain the various products stored in the warehouse. As is known in the art, cardboard boxes have the shape of a parallelepiped having sides which are rectangles. However, other forms of containers may be used in the warehouse system of the invention such as cardboard boxes, paper and plastic bags, and plastic and steel pails.

Chutes 12 have an entrance end 14 and an exit end 16. Entrance end 14 is connected to horizontal beams 18 by any conventional method such as screwing, bolting, or the like. Exit end 16 is connected to horizontal beams 22 by any conventional method such as screwing, bolting, or the like. Horizontal beams 18 and 22 may be I-beams or the like.

Guide rails 20 extend from the beams 18 to the exit end 16 of chutes 12. Guide rails 20 are spaced apart a distance slightly greater than the width "w" of container 13 to form rows of containers on chute 12 and prevent containers 13 from moving from one row to the other. Guide rails 20 are preferably made from plastic rope, but they may be made from plastic or steel pipe, or the like.

Each chute 12 will have a pull rope 24 running the full length thereof. Pull rope 24 is attached to one end of a spring 28. The other end of the spring 28 is connected to beam 18.

Pull rope 24 is a conventional grass or plastic fiber rope and preferably has a plurality of small knots 26 therein tied at desired intervals along rope 24. Knots 26 engage containers 13 when pull rope 24 is pulled and spring 28 is stretched to cause containers 13 to slide down chutes 12. Although it is preferred to use pull ropes 24 to cause containers to slide down chutes 12, if desired, pull ropes 20 could be replaced with a mechanically driven pull system driven by small motors. Spring 28 returns pull rope 24 back to its original location.

Figure 3:
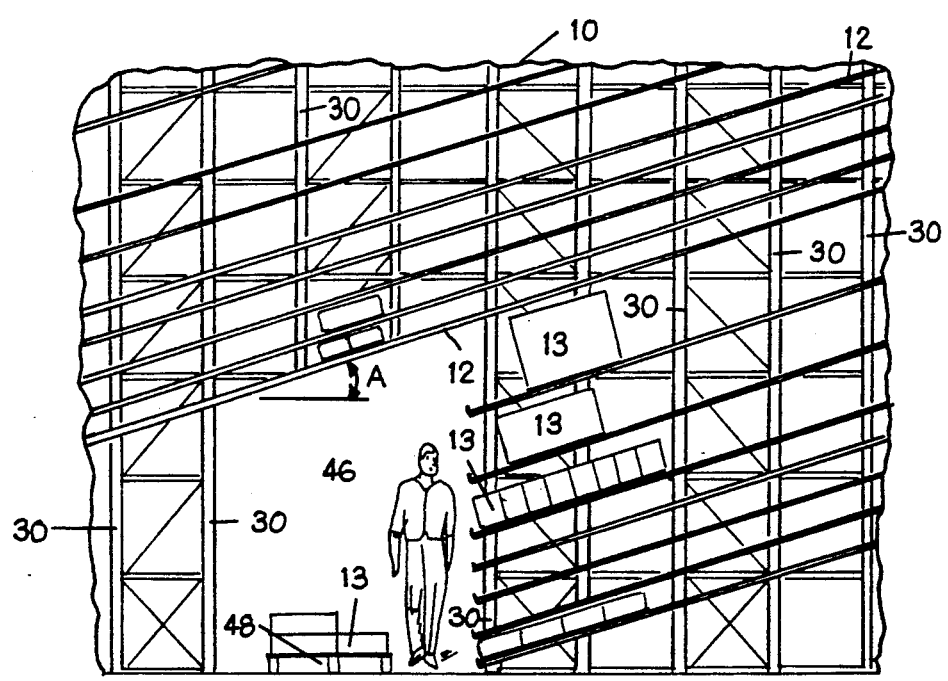
FIG. 3 is a cross-sectional view taken along lines 2—2 of FIG. 1.

Chutes 12 are inclined at an angle indicated by the letter "A" with the horizontal as shown in FIG. 2 and FIG. 3. Angle "A" is determined by the coefficients of friction between the material from which the containers 13 are constructed and the material from which chutes 12 are constructed. Angle "A" is selected so that containers 13 containers will remain stationary on chutes 12 until such time as they are pushed or moved slightly downward due to contact, for example, with knots 26 on pull ropes 20. After the slight downward movement caused by knots 26 to overcome the static coefficient of friction, the angle "A" of the chutes 12 is such that the containers 13 continue to slide downward until they strike horizontal beams 22 or another container 13.

As can be seen in FIG. 3, vertical columns 30 are connected to horizontal beams 18 and 22. Vertical columns 30 may be connected to horizontal beams 18 and 22 in any manner known in the art such as bolting, riveting, welding or the like.

Figure 4:
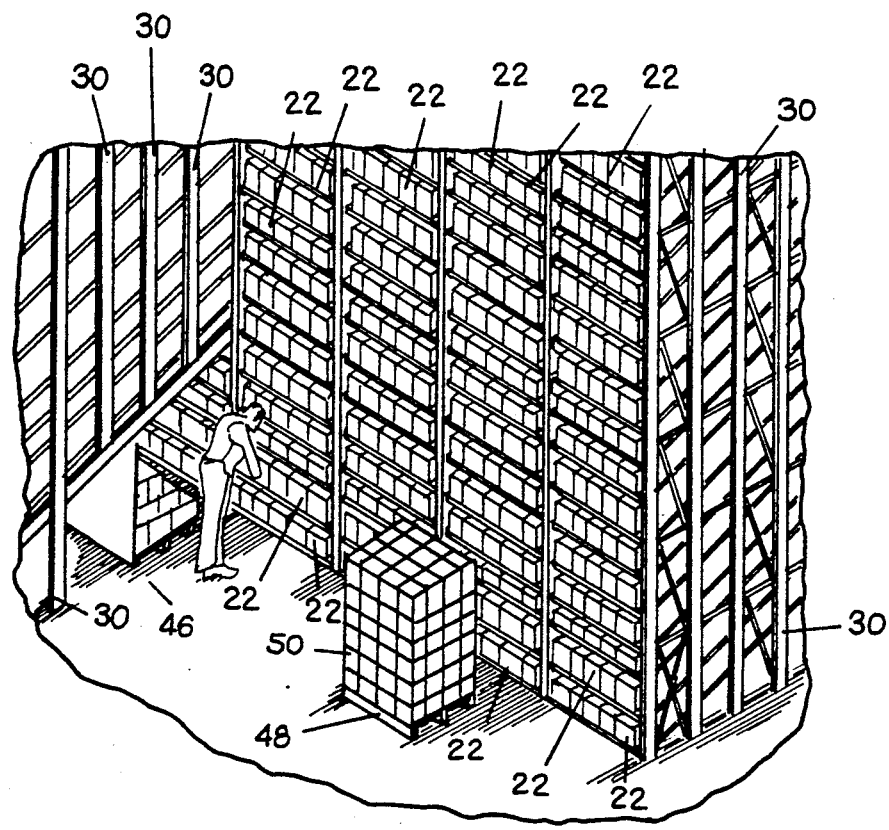
FIG. 4 is a perspective view of the gravity chute racks of the invention with a pallet and warehouseman located on the dispensing side of the racks.
Figure 5:
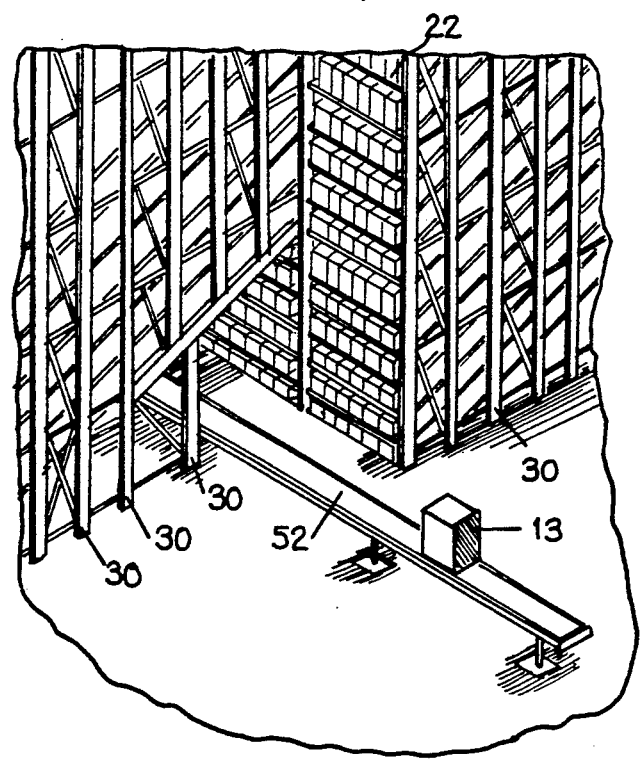
FIG. 5 is a perspective view of the gravity chute racks of the invention showing the conveyer system for transporting products removed from the racks.

Columns 30 are preferably made from structural steel members such as channel iron, angle iron, tubing, or pipe. When pipe is used for all or part of the columns, it may be used as the conduit for a fire sprinkler system commonly utilized in a warehouse. The height of the columns is determined by the height of the warehouse structure. The racks are fitted close together as shown in FIGS. 3, 4, and 5 to maximize the number of containers 13 stored in the warehouse.

As can be seen in FIG. 1, goods are received in containers 13 in trucks 9 and are placed on conventional conveyor belts 32 where the containers move by a conventional in-line coding device 33 which applies labels to the containers 13. The direction of travel of the containers is controlled by the conventional accumulating container conveyors 34 to the gravity slide chute assemblies 10.

Containers 13 move along conveyor 34 to the main distribution conveyor 36. The containers pass by conventional electronic scanners 38, which are well known in the art, which read the label applied to the containers 13 by in-line coding device 33 and operate conventional container diverters (not shown) which are well known in the art. Scanners 38 and conventional container diverters move selected containers to the branch conveyors 40.

Three branch conveyors 40 are shown in FIG. 1 although as many branch conveyors 40 may be used as desired. The branch conveyors 40 shown in FIG. 1 are movable over the top of chutes 12. Branch conveyors 40 may be mounted on tracks(not shown) connected to the tops of columns 30, or branch conveyors 40 may be mounted in any other conventional manner to enable the branch conveyors 40 to be moved. Tracks for mounting branch conveyors 40 may be supported in any conventional manner for supporting tracks. However, branch conveyors 40 may be stationary if desired.

One or more chute diverter conveyors 42 are located on each branch conveyor 40. The chute diverter conveyors 42 are positioned over the correct gravity chute 12 by an operator or a computer controlled system (not shown). Branch conveyors 40 and chute diverter conveyors 42 may operate parallel to or perpendicular to the gravity slide chutes 12. Containers not diverted to a gravity chute 12 are returned to the main distribution conveyor by return conveyors 44.

Containers 13 enter the chutes 12 from the chute diverter conveyors 42 with forward velocity. This velocity overcomes the kinetic coefficient of friction between the containers 13 and the chutes 12. The containers 13 travel downward until they are stopped by other containers on the same chute 12. Once a container 13 at the bottom of a chute 12 is removed, the remaining containers 13 may travel downward because the static coefficient of friction has been overcome by the weight of the container and the angle of the chute 12. If the static coefficient of friction has not been overcome, forward velocity can be applied by pulling pull rope 24 to overcome the static coefficient of friction.

The gravity slide chute assembly 10 brings each container to the shipping tunnels generally indicated by the numeral 46 as shown most clearly in FIGS. 1 and 3. To ship a container 13 to a store, an operator picks a container 13 from a chute 12 and places it on a pallet 48. Once the pallet 48 is full as is generally indicated by the numeral 50 in FIG. 4 and FIG. 5, the full pallet 50 may be picked up by a forklift and placed on a truck 9 to be shipped to the desired location. If desired, a conveyor belt 52 could be used to move containers 13 as shown in FIG. 5 as is well known in the art. Conveyor belt 52 conveys containers 13 to any desired location such as truck 9 or to a conventional stacking station as is well known in the art.

Preferably the distance between columns 30 is identical. This equidistant spacing allows physical inventory to be taken by counting the columns 30 where there are containers stored, multiplying the number of columns by the distance between the columns, and dividing the product by the length of the container. Updating inventory with new containers is accomplished by reading the labels placed on the containers 13 by the in-line coding device 33.

Although the preferred embodiments of the present invention have been disclosed and described in detail above, it should be understood that the invention is in no sense limited thereby, and its scope is to be determined by that of the following claims:

What is claimed is:

1. A warehouse system comprising a chute for receiving and storing containers of goods, said chute being inclined at an angle with the horizontal sufficient to overcome kinetic coefficient of friction between said chute and said container placed thereon, said chute having rope means therein for pulling into contact with containers on said chute to start said containers moving down said chute.

2. The warehouse system of claim 1 wherein said chute is constructed from sheets of rigid material.

3. The warehouse system of claim 2 wherein said sheets are corrugated.

4. The warehouse system of claim 3 wherein said sheets are rectangular.

5. The warehouse system of claim 1 wherein said chute is inclined at an angle with the horizontal which will not overcome static coefficient of friction between chute and said container placed thereof.

6. The warehouse system of claim 1 wherein said chute is inclined at an angle with the horizontal which will overcome static coefficient of friction between chute and said container placed thereon.

7. The warehouse system of claim 1 wherein said chute has an entrance end and an exit end.

8. The warehouse system of claim 7 wherein first conveyor means conveys containers received from container transport means for shipping said containers to the location of said warehouse system to said entrance end of said chute.

9. The warehouse system of claim 1 wherein said containers are cardboard boxes.

10. The warehouse system of claim 7 wherein said cardboard boxes have the shape of a parallelepiped with rectangular sides.

11. The warehouse system of claim 1 wherein said chute has a plurality of parallel guide rail means thereon for holding said containers therebetween.

12. The warehouse system of claim 1 wherein said rope means has a plurality of knot means for contacting and moving said containers.

13. The warehouse system of claim 1 wherein said system comprises a plurality of said chutes.

14. The warehouse system of claim 1 wherein said rope means is connected to a higher end of said chute means by spring means for returning said rope means to its original location after said rope means is pulled.

15. A method for storing containers of products comprising:
   a. inclining a chute at an angle with the horizontal sufficient to overcome kinetic coefficient of friction between said chute and a container placed thereon, said angle with the horizontal being insufficient to overcome static coefficient of friction between said chute and said container placed thereon, said chute having a higher end and a lower end,
   b. placing a container on the higher end of said chute,
   c. pulling a rope means into contact with said container to move said container a distance sufficient to cause the container to slide down said chute toward the lower end of said chute.

16. The method of claim 15 wherein said container is moved to said higher end of said chute by a conveyor.

17. The method of claim 15 wherein said method utilizes a plurality of said chutes.

* * * * *